(12) United States Patent
Zhao

(10) Patent No.: US 11,954,577 B2
(45) Date of Patent: Apr. 9, 2024

(54) DEEP NEURAL NETWORK BASED USER SEGMENTATION

(71) Applicant: Intuit Inc., Mountain View, CA (US)

(72) Inventor: Runhua Zhao, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1244 days.

(21) Appl. No.: 16/570,284

(22) Filed: Sep. 13, 2019

(65) Prior Publication Data

US 2021/0081759 A1    Mar. 18, 2021

(51) Int. Cl.
*G06N 3/049* (2023.01)
*G06N 3/044* (2023.01)
*G06N 3/045* (2023.01)
*G06N 3/08* (2023.01)
*G06N 20/00* (2019.01)

(52) U.S. Cl.
CPC ............. *G06N 3/045* (2023.01); *G06N 3/044* (2023.01); *G06N 3/049* (2013.01); *G06N 3/08* (2013.01); *G06N 20/00* (2019.01)

(58) Field of Classification Search
CPC ........ G06N 3/045; G06N 3/044; G06N 3/049; G06N 3/08; G06N 20/00; G06Q 20/127
See application file for complete search history.

(56) References Cited

U.S. PATENT DOCUMENTS 11,551,239 B2 * 1/2023 Jain .......................... G06F 17/18
2018/0124194 A1 * 5/2018 Rajewski ................. H04L 67/53
2020/0341602 A1 * 10/2020 Schoppe ............... G06F 3/0481

(Continued)

FOREIGN PATENT DOCUMENTS

CN        109190091 A  *  1/2019  .......... G06F 40/126

OTHER PUBLICATIONS

Guo, Long, et al. "Buying or browsing?: Predicting real-time purchasing intent using attention-based deep network with multiple behavior." Proceedings of the 25th ACM SIGKDD international conference on knowledge discovery & data mining. 2019. (Year: 2019).*

(Continued)

*Primary Examiner* — Michael J Huntley
*Assistant Examiner* — Sehwan Kim
(74) *Attorney, Agent, or Firm* — DLA Piper LLP (US)

(57) ABSTRACT

A computer-implemented method and system having computer-executable instructions stored in a memory for processing user behavior features by neural networks to identify user segments. The method includes receiving user datasets from a database along with respective user identifiers, retention labels, static user features and interactive user features associated with an online product during a time period. A first neural network processes the interactive user features to generate a time distributed concatenation representation. A second neural network is configured to generate a vector by embedding the time distributed concatenation representation and the static user features through an embedding layer. The second neural network is configured to process the vector through a plurality of layers. A cluster model is used to determine user segments based on values extracted from nodes of a second to last layer of the second neural network.

20 Claims, 16 Drawing Sheets

(56) References Cited

U.S. PATENT DOCUMENTS

2021/0034403 A1* 2/2021 Yun .................... G06F 9/45558
2021/0035551 A1* 2/2021 Stanton ................. G10L 13/04

OTHER PUBLICATIONS

Zhou, Chang, et al. "Atrank: An attention-based user behavior modeling framework for recommendation." Proceedings of the AAAI conference on artificial intelligence. vol. 32. No. 1. 2018. (Year: 2018).*
López, José J., et al. "Hopfield-K-Means clustering algorithm: A proposal for the segmentation of electricity customers." Electric Power Systems Research 81.2 (2011): 716-724. (Year: 2011).*
Lu, Ning, et al. "A customer churn prediction model in telecom industry using boosting." IEEE Transactions on Industrial Informatics 10.2 (2012): 1659-1665. (Year: 2012).*
Wu, Zhenzhou, et al. "Neural modeling of buying behaviour for e-commerce from clicking patterns." Proceedings of the 2015 international acm recommender systems challenge. 2015. 1-4. (Year: 2015).*
Wang, Ruoxi, et al. "Deep & cross network for ad click predictions." Proceedings of the ADKDD'17. 2017. 1-7. (Year: 2017).*
Ullah, Irfan, et al. "A churn prediction model using random forest: analysis of machine learning techniques for churn prediction and factor identification in telecom sector." IEEE access 7 (2019): 60134-60149. (Year: 2019).*
Zhang, Le, et al. "Coding/decoding method and apparatus", CN 109190091A—translation, 2019. (Year: 2019).*
Wang et al., "Deep & Cross Network for Ad Click Predictions", arXiv:1708.05123 [cs.LG], Aug. 17, 2017, pp. 1-7.

* cited by examiner

200

| User Feature Dataset 128 | | | |
|---|---|---|---|
| Feature Type | Categories | Features | Description |
| Static Firmographics Features 210 | Firmographics | SKU | Users choose a particular product line based on their business needs for certain function and services (i.e. Simple Start, Plus, Advance, Essentials). |
| | | Channel | The channel where user sign up to QBO( i.e. Web, Online, Telesale etc.) |
| | | Migrator | A user transferring from other products or standalone product with desktop computer to the online service product. |
| Interactive User Behavior Features 220 | Attach | Payroll | A user attaches extra Payroll related services on top of QBO |
| | | Payments | A user attaches extra Payment related services on top of QBO |
| | | Accountant | A user attaches an Accountant with QBO |
| | Product Usage | Expense | Adding a list of cost of goods or services and log this information onto QBO |
| | | Invoice | Adding a list of goods sent or services provided and log this information onto QBO |
| | | Payroll Check | Adding a list of checks to QBO systems |
| | Care | Billing & Sub | Initiating self-serve Q&A article or phone call with agent regarding billing and subscription related topics |
| | | Company | Initiating self-serve Q&A article or phone call regarding company info related topics |
| | | Banking | Initiating self-serve Q&A article or phone call regarding banking connection/transaction related topics |
| | | Employees | Initiating self-serve Q&A article or phone call regarding paying employee/checks related topics |

FIG. 2

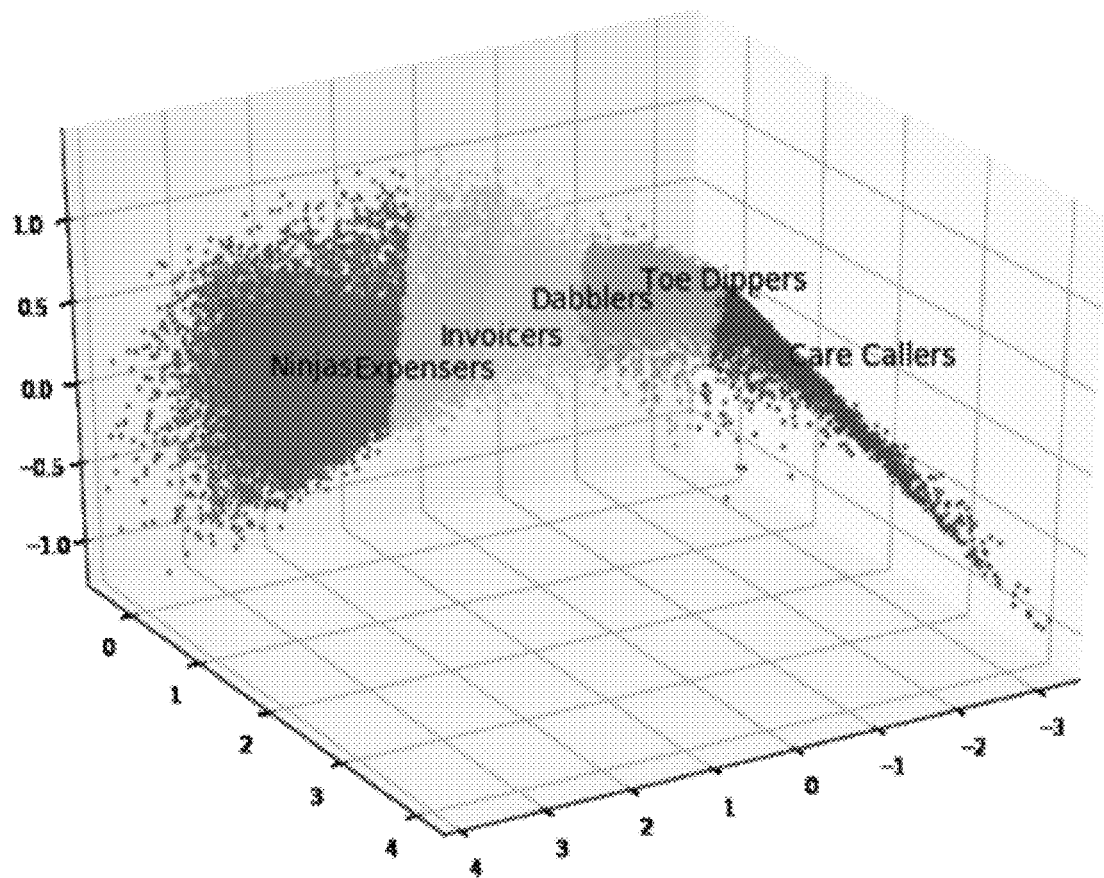

FIG. 8A

| Cluster Name | Business Type | Behavior |
|---|---|---|
| Care Callers | Migrators, Simple Start | Calling for help, churn early |
| Toe Dippers | OA, Simple Start | Have specific things in mind. Not getting it or not trying hard enough, churn early |
| Dabblers | OA, Simple Start | Have specific things in mind. Trying very hard to get it. |
| Invoicers | Simple Start, NTTF | Here for invoicing |
| Expensers | Fairly established businesses | Here for organizing expenses and invoicing |
| Ninjas | Fairly established businesses | Here for organizing expenses and invoicing |

FIG. 8B

| Cluster Name | FY18 90-Day Churn Rate | *FY18 Day 1 Churn Rate |
|---|---|---|
| Ninjas | 1% | N/A |
| Expensers | 3% | N/A |
| Invoicers | 7% | N/A |
| Dabblers | 18% | 2% |
| Toe Dippers | 42% | 9% |
| Care Callers | 73% | 23% |

*Filter: NTTF, Simple Start, no-accountant

New Buy Now user mix is shifting higher towards attrition clusters

**90-day churn rate for
most clusters has worsened**

| Churn Rate by User Segment | FY17 | FY18 | Index | *Index |
|---|---|---|---|---|
| Ninjas | 1% | 1% | 100 | N/A |
| Estimators | 2% | 3% | 113 | N/A |
| Invoicers | 6% | 7% | 117 | N/A |
| Dabblers | 15% | 18% | 115 | 216 |
| Toe Dippers | 35% | 42% | 118 | 246 |
| Tyre Kickers | 69% | 73% | 105 | 115 |

Index : 90 day churn rate Year-over-year (YOY) (no filter)
*Index: day 1 churn rate Year-over-year (YOY) (filter: NTTF, SS, no-accountant)

FIG. 9B

Customer Segment Profiles

| Segments | | Care Caller | Toe Dipper | Dabbler | Invoicers | Expenser | Ninja |
|---|---|---|---|---|---|---|---|
| Firmographics | Simple Start | 38% | 47% | 49% | 47% | 38% | 21% |
| | OA | 27% | 37% | 37% | 36% | 32% | 24% |
| | Migrator | 34% | 11% | 9% | 13% | 22% | 36% |
| Attach | Payroll | 3% | 5% | 7% | 10% | 17% | 25% |
| | Payments | 2% | 5% | 11% | 18% | 24% | 34% |
| | Accountant | 6% | 11% | 17% | 27% | 39% | 46% |
| Product Usage | Expense | 11 | 7 | 31 | 57 | 81 | 66 |
| | Invoice | 4 | 1 | 4 | 9 | 11 | 29 |
| | Payroll Check | 0.5 | 0.1 | 0.1 | 0.5 | 1.6 | 4.9 |
| | Billing & Sub | 0.03 | 0 | 0 | 0 | 0 | 0 |
| Care | Company | 0.05 | 0.01 | 0 | 0.01 | 0.01 | 0.02 |
| | Banking | 0.04 | 0.01 | 0.01 | 0.02 | 0.02 | 0.03 |
| | Employees | 0.06 | 0.01 | 0.01 | 0.02 | 0.04 | 0.08 |
| | Size | 4% | 18% | 20% | 22% | 23% | 12% |
| Churn | Churn | 73% | 42% | 18% | 7% | 3% | 1% |

DEEP NEURAL NETWORK BASED USER SEGMENTATION

The present disclosure relates to cohort analysis, and more specifically to applying deep neural networks to process user behavior features for identifying user segments and, in some embodiments, providing personalized recommendations for an individual user.

BRIEF DESCRIPTION OF THE DRAWINGS

FIG. 2 illustrates example features of a user feature dataset structure in accordance with some embodiments of the present disclosure.

FIG. 8A illustrates a three-dimensional graph representing example user segments in accordance with some embodiments of the present disclosure.

FIG. 8B illustrates example clusters in accordance with some embodiments of the present disclosure.

FIG. 9B illustrates example churn rates of each cluster of year FY17 and FY18 in accordance with some embodiments of the present disclosure.

FIG. 10 illustrates example user segment profiles with user features and churn information for each user segment in accordance with some embodiments of the present disclosure.

FIG. 12A illustrates example predicted retention levels to provide personalized recommendations to users in accordance with some embodiments of the present disclosure.

DETAILED DESCRIPTION

Figure 1:
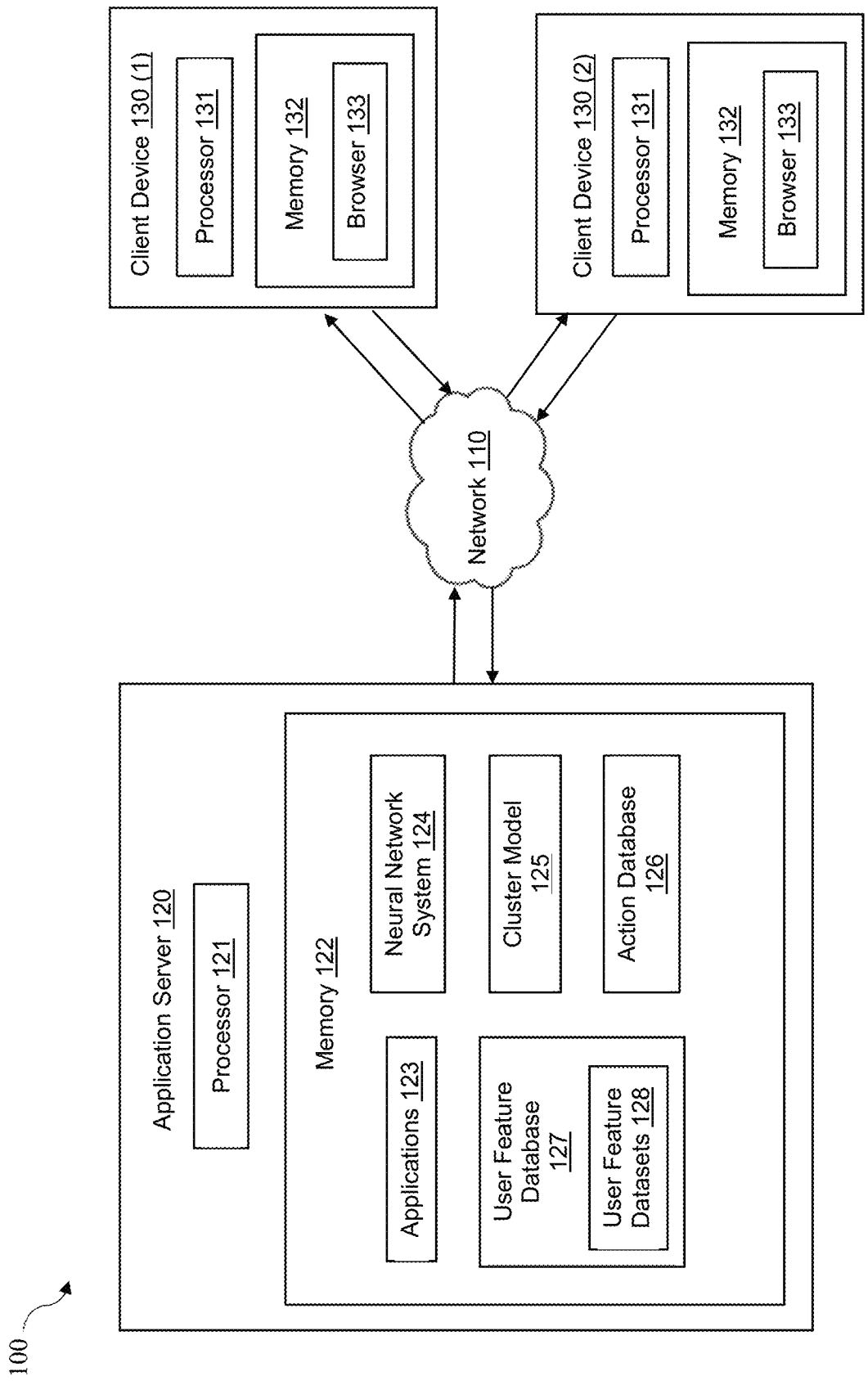
FIG. 1 illustrates a hardware structure of an example system in accordance with some embodiments of the present disclosure.

Embodiments of the present disclosure describe techniques of implementing a neural network system with deep neural networks for cohort analysis by processing and analyzing historical user features to manage subscriptions to an online product.

A great number of users may subscribe to one or more commercial online products (e.g., online service or software products). It may be useful to provide an efficient method and system to predict users' behaviors (e.g., activities) for a business to timely make decisions or recommendations to users in order to maintain user retention rate and further increase product engagement. Due to a variety of user types and complex nature of the online service products, existing human intervened methods or management systems may not be able to analyze complex historical use features associated with users' behaviors interacting with the online service products. Alternatively, users may not know their true needs or how to use the online service products to help them well when they first subscribe to the products.

To address these issues, some embodiments may utilize deep learning technology to analyze the complex user behavior data including time-stamped user interaction features, to predict users' retention rate or churn rate, and further to generate valuable personalized recommendations for an individual user to lower churn and increase product engagement.

Embodiments described herein are directed to a system and method to build and apply a neural network system with deep neural networks to analyze historical user features associated with an online product and identify user segments sharing common features and user behaviors within a defined time-span when users interact with an online product. Further, the system and method may provide personalized recommendations for individual users based on the identified segments.

The embodiments address a computer-centric and Internet-centric problem of an online product service management to predict users' behaviors to retain attention and lower churn, and further increase product engagement. The neural network system may be implemented as computer programs or application software on one or more computing devices that process user features collected by a data management system.

In some embodiments, a large group of users may be classified into user segments (e.g., cohorts, clusters or groups) based on the user data features. Users in a particular segment may be referred to as "cohort" and the related cohort may share common features or behaviors with a subscribed online product within a defined time-span. For example, the product or service may be online software products, such as QuickBooks™ Online (QBO) products or services. Cohort analysis may provide a business with user behavior patterns across the life-cycle of users engaging with a product or service. User behavior patterns may be analyzed to predict future churn rate and user activities. By analyzing or viewing user behavior patterns, a service provider may adapt and customize its service to those specific cohorts or an individual user.

Dynamic user segmentation can reveal insights about observed user behaviors and behavior patterns that similar users may exert when interacting with a particular online product. For example, an insight about user behaviors may be used to predict most possible actions in a particular future period for a segment of users. The system may predict churn rate and churn size of the segment of users and recommend relevant content for the segment of users to further increase product engagement. Dynamically and accurately clustering user features including associated behaviors may be conducted by a deep neural network system to reduce feature dimensions for user segments. The present disclosure may use a data backed, target based and unsupervised deep learning model to process user features for forming clusters representing each user segment as an exploratory analysis to understand hidden patterns of user behaviors. User churn rate and churn size of a particular user segment may be predicted based on the churn changes during a period of time. Such user segments can be used to perform respective user feature or behavior comparison among cohorts for the system to automatically understand and identify any issues related to product engagement.

User similarity may be defined as an overlap between the full set of features describing each user and behaviors. By clustering users according to user similarity in high-level dimensions, it may be possible to more successfully predict the needs of the corresponding user segments as related to the product under consideration.

Embodiments described herein may improve the technical fields of combining natural language processing (NLP) and deep neural networks for clustering users into respective user segments by processing natural language based user behavior features. The improvements of the present disclosure as reflected in embodiments described herein may create a robust neural network system for clustering unseen text or unseen user behavior when predicting user future features or behaviors.

FIG. 1 illustrates an example computing system 100 that may be used to analyze user feature data to identify user segments for providing user recommendations associated with user subscriptions and product usages. As illustrated, system 100 may include an application server 120 (e.g., a server computing device) and a plurality of client devices 130 (e.g., a user/client computing device). Application server 120 may be in communication with a plurality of client devices 130 with in a cloud-based or hosted environment via a network 110. Application server 120 may include a processor 121, a memory 122 and a communication interface for enabling communication over network 110.

Application server 120 may include one or more online applications 123 stored in memory 122 and executed by processor 121 for providing one or more online services and providing a website with particular services for users to visit. In some embodiments, application server 120 may include a neural network system 124, a cluster model 125, a user feature database 127 including user feature datasets 128, and an action database 126, etc. Application server 120 may include a deep neural network system 124 to process user feature datasets for user segmentation. The deep neural network system 124 may be one of the components of the applications 123. Applications 123 may include a web application to provide an online software service that may be accessed by the client device 130 via a browser application 133. Further, memory 122 may store applications 123 and a neural network system 124, and other program modules which are implemented in the context of computer-executable instructions and executed by application server 120.

Client device 130 may include a processor 131, a memory 132, and a browser application 133. Browser application 133 may facilitate user interaction with application server 120 and may be configured to transmit information to and receive information from application server 120 via network 110. Client device 130 may be any device configured to present user interfaces and receive inputs thereto. For example, client device 130 may be a smartphone, a personal computer, a tablet, a laptop computer, a personal digital assistant (PDA), or any computing system that are equipped with browser application 133, which may be used to provide a convenient interface to allow a user to interact with an online application product running in application server 120 over network 110. Network 110 may be the Internet and/or other public or private networks or combinations thereof.

Application server 120 is depicted as a single device for ease of illustration, but those of ordinary skill in the art will appreciate that application server 120 may be embodied in different forms for different implementations. For example, application server 120 may include a plurality of servers communicating with each other through network 110. Alternatively, the operations performed by application server 120 may be performed on a single server. In another example, a plurality of client devices 130 may communicate with application server 120. A single user may have multiple client devices 130, and/or there may be multiple users each having their own client device(s) 130.

Users may choose a variety of online software products or services provided by application server 120 to utilize particular services, such as financial management and tax return preparation and filing, using browser application 133 through client devices 130. Specific examples of software products or services include, but are not limited to QuickBooks™, TurboTax™ standalone or online software products or services available from Intuit, Inc. and/or various other software systems known to those of skill in the art and/or as developed in the future. The user feature database 127 may store user profiles including a plurality of historical user features or attributes representing user behaviors while the users interact with application server 120 regarding various products or services through client devices 130. Each user may create a user account with user information for subscribing and accessing a particular product or service provided by the application server 110. Each user account with user information may be stored as each user profile including user name, user identifier (ID), email address, phone number, payment transaction accounts, and any other user information.

System 100 may include a user feature database 127 and an action database 126 which may be coupled to or in communication with the application server 120 via network 110. User feature database 127 and action databased 126 may each be a shared remote database, a cloud database, or an on-site central database. User feature database 127 and action database 126 may receive instructions or data from and send data to application server 120 via network 110.

User feature database 127 may store user profiles and historical user feature data representing user behaviors during a certain time period while users interact with application server 120 regarding various products or services (e.g., QuickBooks™ products or services) through client devices 130 via network 110. The certain time period may be a 90-day retention of a user subscription to an online product, for example. The certain time period may be one or more weeks, for example. The historical user feature data may be stored as user feature datasets 128 in a particular data format to include a plurality of features (e.g., hundreds of attributes)

for each user. Historical user feature datasets 128 may include user types and main user behaviors to represent why users choose and how users interact with a particular product or service, such as QuickBooks™ online application. Historical user feature data may be analyzed to show patterns of users' behaviors and further predict churn sizes and churn rates of different user groups or segments. Application server 120 may provide personalized recommendations to the respective users to lower attrition and to increase product engagement. Personalized recommendations may be integrated with the online application described in-product notifications and/or displayed in the online application. Recommendations may be generally referred to as actions and may also be efficiently stored in an action database 126A.

FIG. 2 illustrates example features of a user feature dataset structure 200 in accordance with some embodiments. Original user feature datasets 128 associated with a plurality of users may be acquired by a data management system in communication with the application server 120. The original user feature datasets 128 may include static firmographics features 210 and interactive user behavior features 220. Different features may be configured and represented in different data formats to show the respective user behavior information associated with a subscription to a product.

In some embodiments, the user feature datasets 128 may include a plurality of categories of features. For example, as illustrated in FIG. 2, the user feature datasets 128 may include four categories of features. Each category may include one or a plurality of features. Each feature may be represented by natural language based words, phrases, sentences, etc.

The static firmographics features 220 may be stored in user feature database 127 or a separate database. The static firmographics features 210 may include a category of static firmographics features. The static firmographics features may include user type based features to describe the products that users subscribe to use and user background information. The user background information may include which channel a user comes from. For example, the static firmographics features may include three features such as "SKU", "Channel", and "Migrator" (e.g., user changed from a standalone mode to online mode). The types called "SKU" may represent product types provided by a service provider with certain functions and services based on user needs. A user may choose one particular product type from a plurality of types of products, such as "Simple Start," "Plus," "Advance," "Essentials," etc. A user may be represented with a feature of "SKU" representing "Simple start" to indicate that the user just starts to use the type of product. A user may be represented with a feature of "Channel" to indicate a channel where the user signs up to an online product. A user may be represented with a feature of "Migrator" which indicates that the user transferred to use the online product from a standalone product provided by the same service provider or different products provided by other service providers. The static firmographics features 210 may be assigned and represented with a predefined data format. The static firmographics features may comprise constant vectors indicative of a plurality of user type based features. For example, each "Firmographics" feature may be represented as one number assigned to each user, and the number may be unchangeable.

Table 1 illustrates an example of a partial static firmographics features 210 stored in user feature database 127. As illustrated, each row of the example static firmographics features 210 represents non-repetitive user information/features that are time-invariant features, such as "SKU," "Sign in Channel," "Industry Type," etc.

TABLE 1

| User ID | Firmographics Feature 1 | Firmographics Feature 2 |
|---------|--------------------------|--------------------------|
| 123     | xx                       | yy                       |
| 456     | xy                       | yz                       |

The interactive user behavior features 220 may be stored in user feature database 127 or a separate database. The interactive user behavior features 220 may include a plurality of categories representing user behaviors or activities, such as "Product Usage", "Attach" (e.g., financial behaviors) and "Care" as illustrated in FIG. 2. Each category of the interactive user behavior features 220 may include a plurality of features to represent user behaviors or activities. The data format of the interactive user behavior features 220 may be continuous, categorical, time-series or a combination of all. For example, regarding the category of "Care", the user feature database 127 may record and label which category/topic of a conversation or online chat is about (i.e., Billing, Banking, Employee, etc.) when a user-agent interaction happens. In some embodiments, the category of "Care" may also include a self-help article which explains in length how to address some commonly known problems and how users may solve the problems by themselves. User activities associated with the category of "Care" may be recorded in database 127.

In some embodiments, the original user feature datasets 128 may be provided with word vectors corresponding to a text corpus with a number of words. The interactive user behavior features 220 may be stored as natural language text representations in the user feature database 127. The natural language text representations of user features may include words, phrases, sentences, and paragraphs, etc. Text representations may be preprocessed by tokenization, removing unnecessary punctuation, removing stop words, etc. Table 2 illustrates an example of a partial interactive user behavior 210 stored in user feature database 127. As illustrated, each row of the example interactive user behavior 210 may be repetitive for a given user. In another words, a user may have several rows of records with each row represents a particular time stamp (i.e. day 1 activity, day 2 activity or week 1 activity, week 2 activity and etc., in which the level of granularity varies project to project).

TABLE 2

| User ID | Time  | Feature 1 |
|---------|-------|-----------|
| 123     | Day 1 | 1         |
| 123     | Day 3 | 2         |
| 456     | Day 2 | 7         |
| 456     | Day 8 | 5         |

The interactive user behavior features 220 may be converted to high-dimensional time-stamped vectors to represent user behaviors about how users interact with the product. In some embodiments, before being fed into the neural network system 124, the interactive user behavior features 220 may be preprocessed through natural language processing (NPL) and transformed into computer readable vectors using any type of word embedding algorithms, such as Global Vectors (GloVe), Word2Vec, fastText, etc. In some embodiments, GloVe algorithm may be used to build semantic word embeddings and vectors for the user data features.

Figure 3:
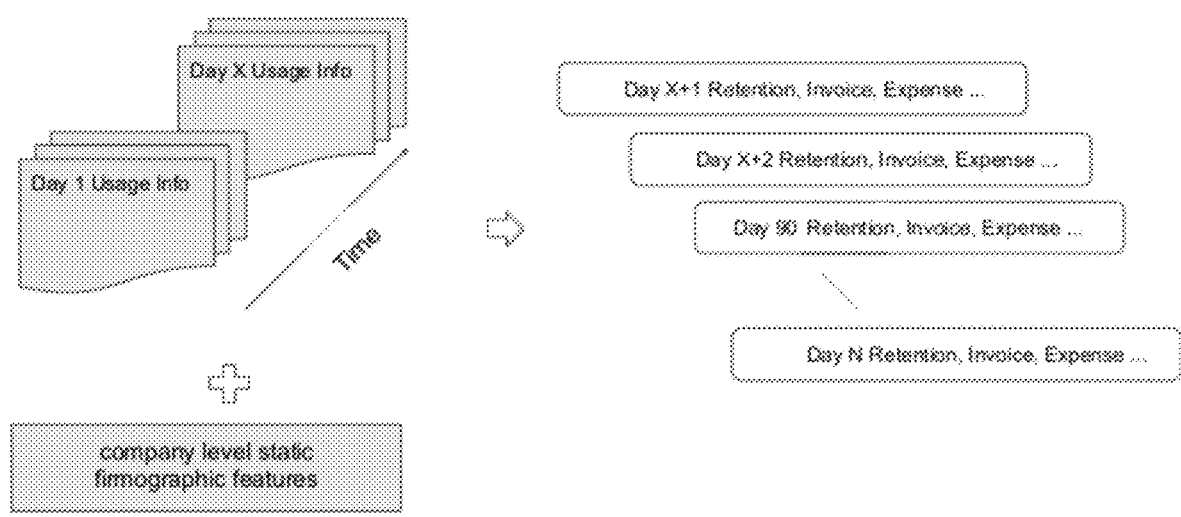
FIG. 3 illustrates an example time-stamped historical user feature data structure in accordance with some embodiments of the present disclosure.

A data structure of static firmographics features 210 and interactive user behavior features 220 may be represented with the information illustrated at the left right hand side of FIG. 3. In some embodiments, the user features for a given user may include one row of static firmographic feature and several rows of interactive user behavior features during a period of time.

FIG. 3 illustrates an example time-stamped historical user feature data structure in accordance with some embodiments. User feature data for each user may include company level static firmographics features and time-stamped interactive user behavior features (e.g., product usage information) collected by a data management system during a time period of past N days. Time-stamped interactive user behavior features of each day may include features of a certain day retention, invoice, expense, and other product usage information illustrated in FIG. 2.

Figure 4A:
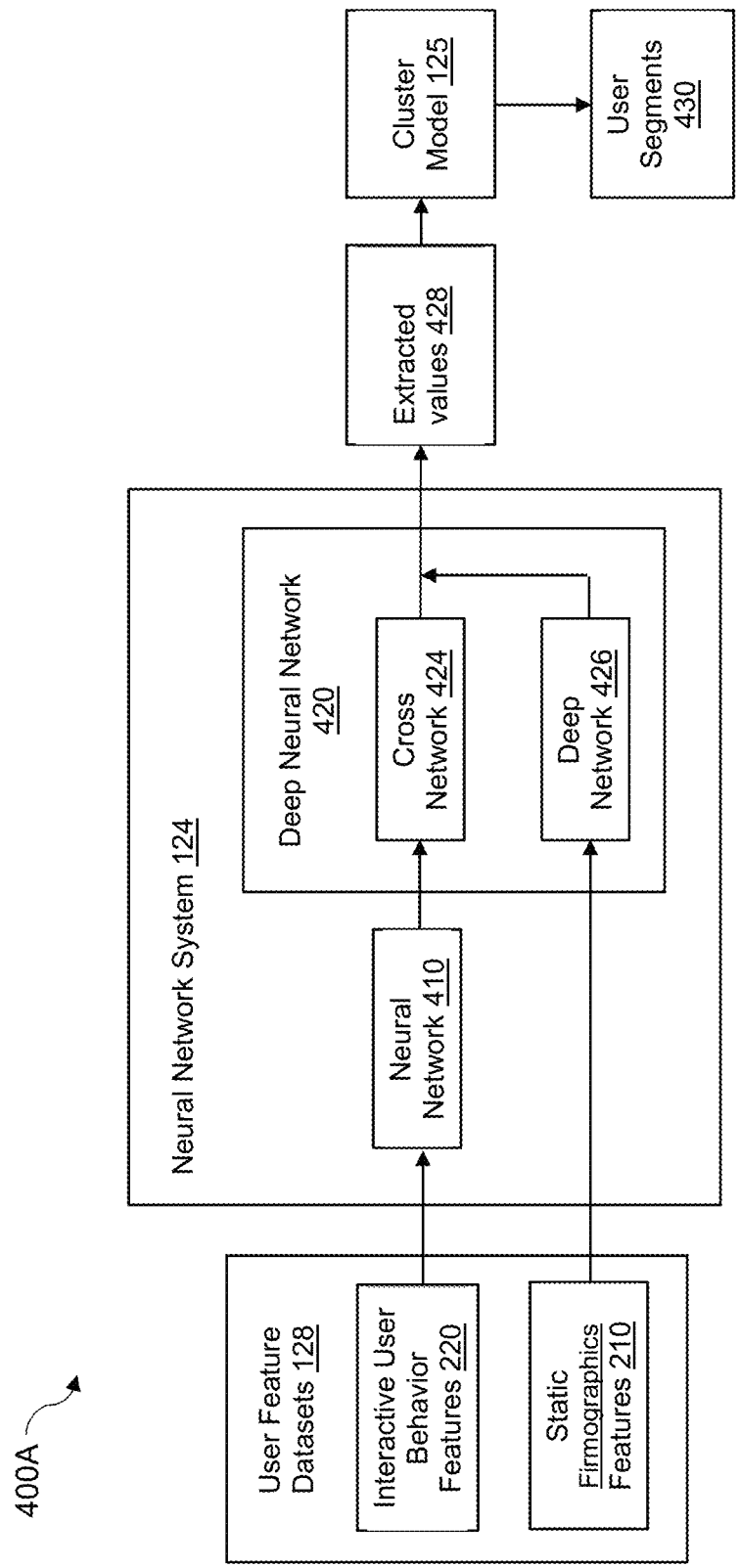
FIG. 4A is a diagram of an example system for identifying user segments in accordance with some embodiments of the present disclosure.
Figure 4B:
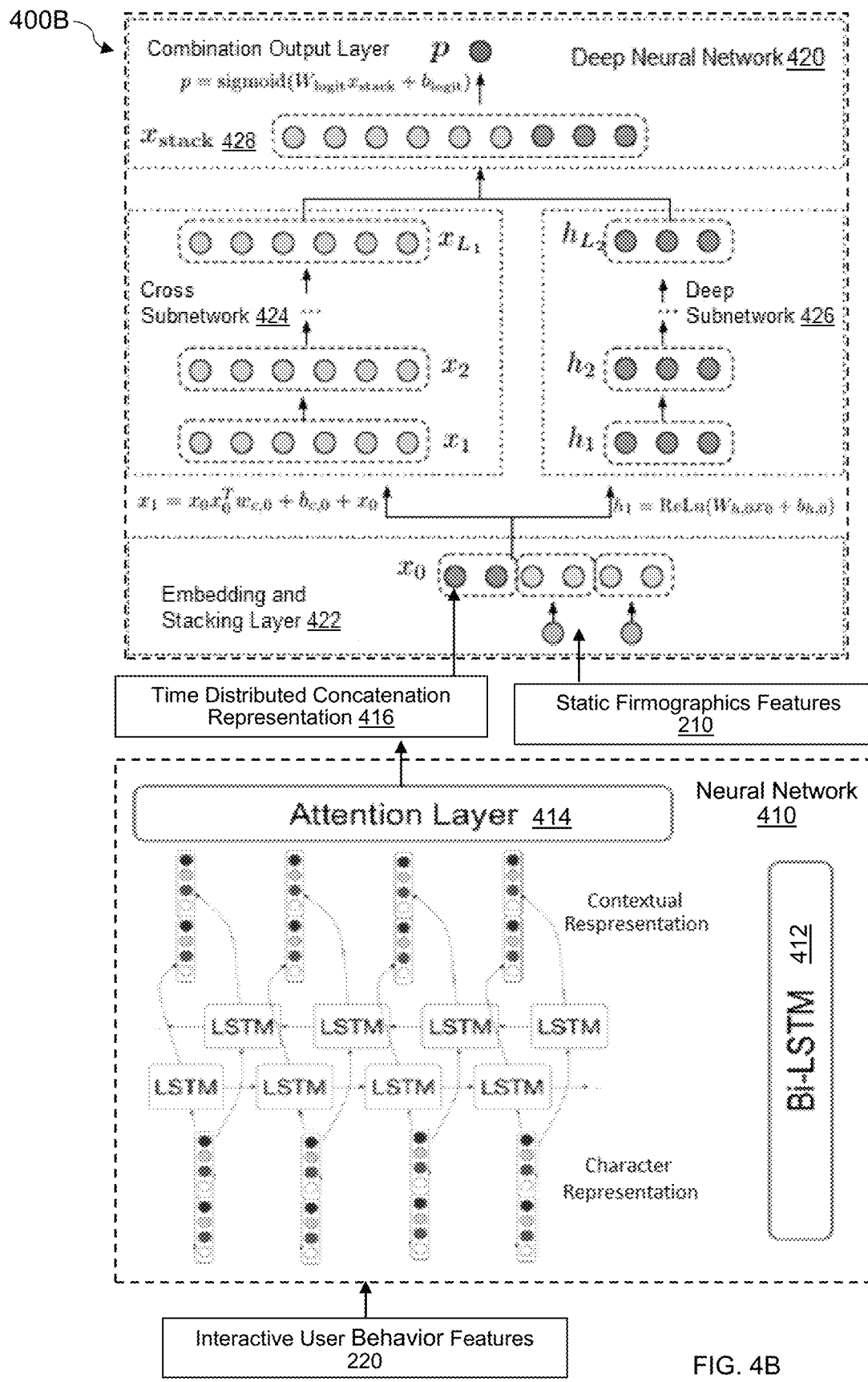
FIG. 4B is a diagram of an example system for generating a condensational representation of user feature datasets for identifying user segments in accordance with some embodiments of the present disclosure.

FIG. 4A is a block diagram of an example system 400A for identifying user segments in accordance with some embodiments of the present disclosure. FIG. 4B is a block diagram of an example system 400B for generating a condensational representation 428 of use feature datasets 128 for identifying user segments 430 in accordance with some embodiments of the present disclosure. The system 400A and system 400B may be configured as computer programs (e.g., software) executed on one or more computers, in which the systems, model components, processes, and embodiments described below can be implemented.

Application server 120 may include a neural network system 124 that may be trained to build contextual representations based on natural language based character representations of the interactive user behavior features 220. All of the user feature datasets fed into neural network system 124 may go through a compression process so that different features with vastly different scales and dimensions may be balanced out and produce layers of representative neurons or nodes for each user. As illustrated in FIG. 4A, neural network system 124 may include a neural network 410 and a deep neural network (DNN) 420. The neural network 410 may include multiple layers of bidirectional LSTM (Bi-LSTMs) 412 and an attention layer 414.

Figure 5:
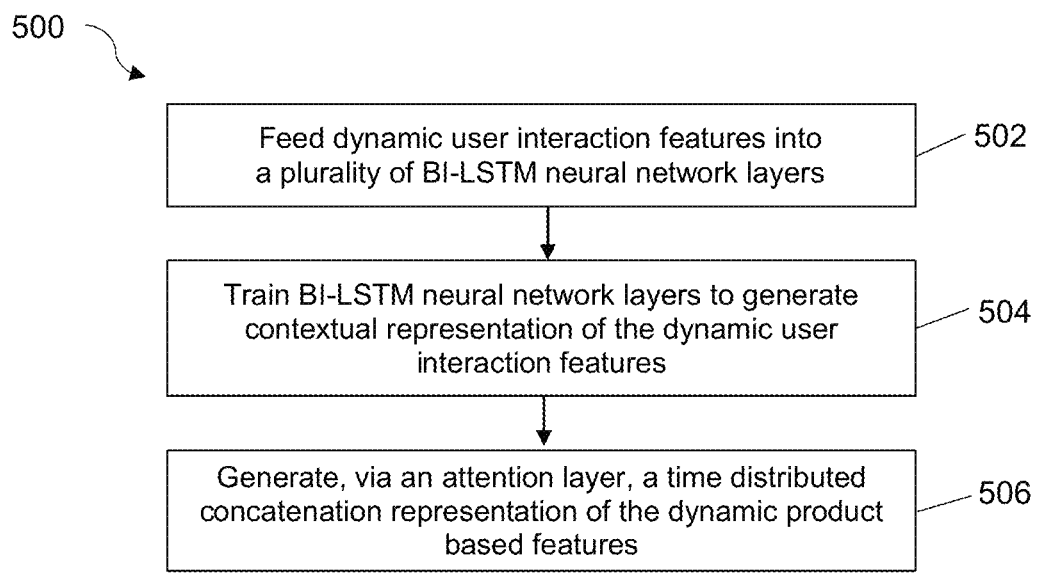
FIG. 5 is a flowchart illustrating an example process configured to extract character-based features from the interactive user behavior features in accordance with some embodiments of the present disclosure.

FIG. 5 is a flowchart illustrating an example process 500 configured to extract character-based features from the interactive user behavior features 220 in accordance with some embodiments of the present disclosure. The process 500 may be configured as computer programs (e.g., software) executed on one or more computers, in which the systems, model components, processes, and embodiments described below can be implemented.

At 502, application server 120 may receive and feed the interactive user behavior features 220 of the original user feature datasets 128 to the neural network 410. The interactive user behavior features 220 may be represented as a character representation of the interactive user behavior features 220.

At 504, the Bi-LSTMs neural network layers 412 may be trained to learn model weights to process the interactive user behavior features 220 to generate a contextual representation of the interactive user behavior features 220.

At 506, as illustrated in FIG. 4B, the attention layer 414 may receive outputs of contextual representations of the interactive user behavior features 220 from the Bi-LSTMs neural network layers 412 and may learn to attenuate irrelevant modalities while amplifying the most informative modalities to extract relevant context from the contextual representation of the interactive user behavior features 220. The attention layer 414 may be used to improve model performance in terms of obtaining aggregated representations of any input text by focusing on different parts of the text differently. The attention layer 414 may be configured to output an embedding vector of a time distributed concatenation representation 416 of the interactive user behavior features 220. The time distributed concatenation representation 416 may represent embedding vectors of the interactive user features behavior 220.

Application server 120 may include a deep neural network 420 configured to generate a condensational representation of user data features 128. The deep neural network model 420 may include an embedding and stacking layer 422, a cross subnetwork 424 and a deep subnetwork 426.

The embedding and stacking layer 422 may be represented by a vector $x_0$ which may be generated by stacking a time distributed concatenation 416 and the static firmographics features 210 together. Static firmographics features 210 may be binary features fed into the embedding and stacking layer 422. The generated vector $x_0$ may be fed to and may train the cross subnetwork 424 and the deep subnetwork 426 respectively.

Cross subnetwork 424 may be represented as a cross linear combination of all the interactive user behavior features 220. Cross subnetwork 424 may include a plurality of cross layers and each layer may be represented by a function of equation 1:

$$x_{l+1} = x_0 x_l^T w_l + b_l + x_l = f(x_l, w_l, b_l) + l_l. \tag{1}$$

where $x_l$, $x_{l+1} \in \mathbb{R}^d$ are column vectors denoting the outputs from the l-th and (l+1)-th cross layers, respectively; $w_l$, $b_l \in \mathbb{R}^d$ are the weight and bias parameters of the l-th layer. Each cross layer adds back its input after a feature crossing f. For example, a vector $x_0$ by stacking a time distributed concatenation representation 416 and the static firmographics features 210 may be fed to cross subnetwork 424 to generate a first layer output $x_1$ (equation 2).

$$x_1 = x_0 i_0' w_{c,0} + b_{c,0} + x_0 \tag{2}$$

Deep subnetwork 426 may be a fully-connected feed-forward neural network and each deep layer of the deep subnetwork 426 may be represented by a function of equation 3:

$$h_{l+1} = f(w_l h_l + b_l) \tag{3}$$

where $h_l \in \mathbb{R}^{nl}$, $h_{l+1} \in \mathbb{R}^{nl+1}$ are the l-th and (l+1)-th hidden layer, respectively; $W_l \in \mathbb{R}^{nl+1 \times nl}$, $b_l \in \mathbb{R}^{nl+1}$ are parameters for the l-th deep layer; and f(·) may be the Rectified Linear Unit (ReLU) Activation function. The rectified linear activation function may return the value provided as input directly, or the value 0.0 if the input is 0.0 or less. For example, a vector $x_0$ by stacking a time distributed concatenation representation 416 and the static firmographics features 210 may be fed to the cross subnetwork 424 to generate a first layer output $h_1$ (equation 4).

$$h_1 = \text{ReLu}(W_{h,0} x_0 + b_{h,0}) \tag{4}$$

On a second to last layer of the trained deep neural network 420, the outputs from the cross subnetwork 424 and the deep subnetwork 426 may be concatenated or stacked to generate a concatenated vector $x_{stack}$ 428. The values of the concatenated vector $x_{stack}$ 428 may be fed to a cluster model 125 which may be configured to perform clustering on the concatenated vector $x_{stack}$ 428 to identify the user segments 430.

Figure 6:
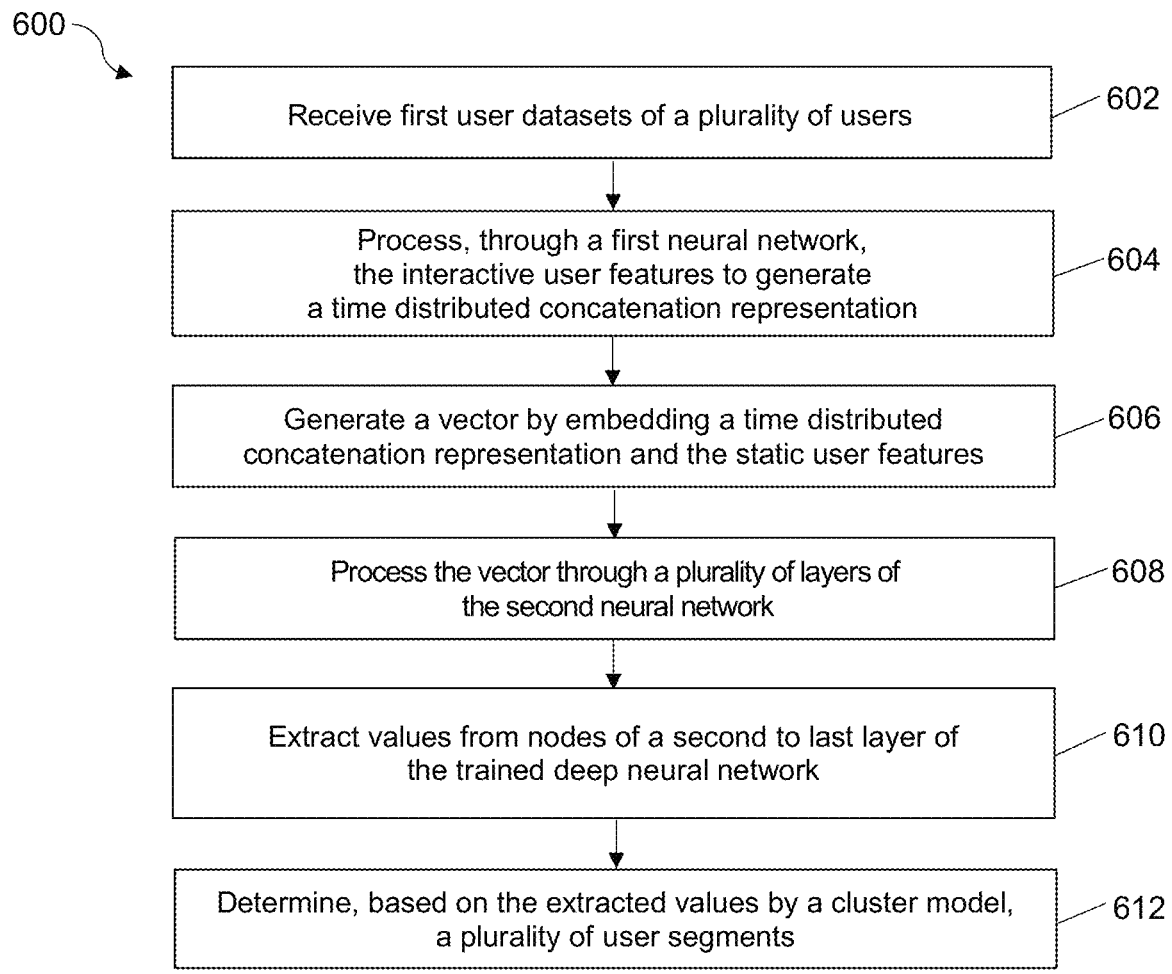
FIG. 6 is a flowchart diagram illustrating an example process configured to process user feature datasets, to perform clustering to identify user segments, and to provide personalized recommendations to lower attrition in accordance with some embodiments of the present disclosure.

FIG. 6 is a flowchart diagram illustrating an example process 600 configured to process user feature datasets, to perform clustering for identifying user segments, and to provide personalized recommendations to lower attrition in accordance with some embodiments. The process 600 may be configured as computer programs (e.g., applications 123) executed on application server 123 or other computers, in which the systems, model components, processes, and embodiments described below can be implemented.

At 602, the application server 120 may receive a plurality of original user feature datasets 128 associated with a plurality of users from user feature database 127 as training datasets. The user feature datasets may comprise respective user identifiers, retention labels, static features and interactive user behavior features related to users' accessing an online service product via at least one network. Each user feature dataset may include a retention label indicative of whether a user cancels a subscription to an online product or not. For example, the retention label of each user feature dataset may be a binary number to indicate whether a user churns or not during a time period after starting a subscription to an online product. The retention label may be a user retention status about a subscription to the online service product after a predetermined number of days. For example, the time period may be a 90-day retention of a user subscription after starting a subscription to the online service product.

At 604, interactive user behavior features 220 may include a time-stamped character representation of the original user feature datasets 128. As described in the process 500, the application server 120 may apply a Bi-directional Long Short-Term Memory (Bi-LSTM) neural network to generate a contextual representation and an attention layer 414 to further generate an output as a time distributed concatenation representation 416. The time distributed concatenation representation 416 may represent embedding vectors of the interactive user features behavior 220.

At 606, by referring to FIGS. 4A-4B, the embedding and stacking layer 422 of the deep neural network 420 may be represented by a vector $x_0$ which may be generated by embedding a time distributed concatenation 416 and the static firmographics features 210 together. At 608, the vector $x_0$ may be fed into the deep neural network (DNN) 420. The deep neural network 420 may process the vector $x_0$ through a plurality of layers of the deep neural network 420. As illustrated in FIG. 4B, the cross subnetwork 424 and the deep subnetwork 426 may be two neural networks jointly being trained based on the retention labels with the same vector $x_0$ to go through multiple deep learning layers till convergence. Each layer may produce high-order interactions based on values of the previous layer. Cross subnetwork 424 may be trained by conducting a linear cross feature combination of the vector $x_0$. Deep subnetwork 426 may be a fully-connected feed-forward neural network as described above and may be trained with the same vector $x_0$ till convergence. Deep subnetwork 426 may be configured to utilize a Rectified Linear Unit (ReLU) at each layer for processing the vector $x_0$ to generate a vector representation of static data features. The DNN 420 may be configured to learn the relationship or a non-linear mapping between various sources of inputs associated with user features to an output target. The output target may be keeping using QBO products within the first 90-day retention since a user signup date. The last layer of the DNN 420 is a combination output layer which may output a probability score ranging from 0 to 1. The probability score may be used to evaluate how accurate the DNN model is when comparing with an actual output target of keeping using QBO products within the first 90-day retention since a user signup date. Since the same probability score from the last layer of the DNN 420 may represent combinations of different user features from different users, the system may use an output from a second to last layer of the DNN network 420 to identify user segments and the users in each segment who share the similar or same features. On a second to last layer of the trained deep neural network 420, outputs of the linear cross feature combination from the cross subnetwork 424 and outputs of the vector representation of static data features from the deep subnetwork 426 may be concatenated or stacked to generate a concatenated vector $x_{stack}$ 428.

At 610, values of a concatenated vector $x_{stack}$ 428 may be extracted from nodes of the second to last layer of the deep neural network 420. The concatenated vector $x_{stack}$ 428 may represent the most condensed representation of static firmographics features 210 and interactive user behavior features 220 for each user.

At 612, the values of the concatenated vector $x_{stack}$ 428 may be fed to a cluster model 125 for identifying the user segments 430. Based on the values of the concatenated vector 428, cluster model 125 may be configured to perform clustering on the concatenated vector $x_{stack}$ 428 and determine a plurality of user segments 430 with respective segment identifiers for the users.

In some embodiments, clustering model 125 may be a separate unsupervised cluster model trained with the retention label which represents user churn status within the first 90 days since the service product signup date. Clustering model 125 may use an unsupervised method because there is no known answer to user segments. For example, a K-means clustering model may be used to perform the clustering of the values of the concatenated vector $x_{stack}$ 428 into clusters as a plurality of user segments. In some embodiments, Silhouette method may be used to quantify the validation of clusters and iterate until a satisfied and accurate cluster is reached.

Figure 7:
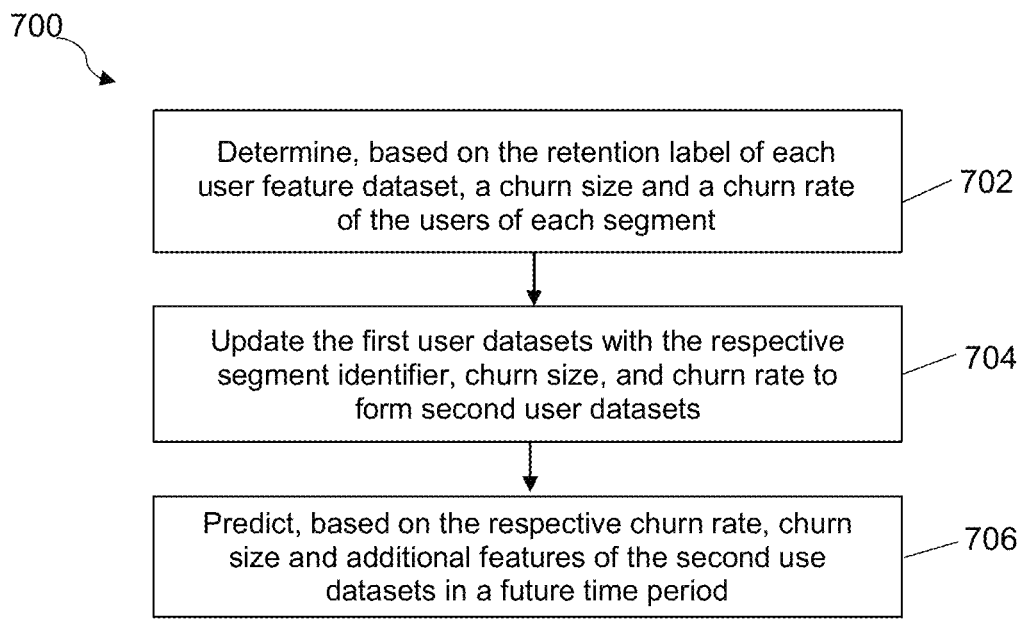
FIG. 7 is a flowchart diagram illustrating an example process configured to predict user retention levels for each user segment in a future time period in accordance with some embodiments of the present disclosure.

FIG. 7 is a flowchart diagram illustrating an example process 700 configured to determine a churn size and a churn rate of the users of each segment, and predict user retention levels for each user segment in a future time period in accordance with some embodiments. The process 700 may be configured as computer programs (e.g., applications 123) executed on applications 123 or other computers, in which the systems, model components, processes, and embodiments described below can be implemented.

At 702, application server 120 may determine, based on a retention label of each user feature dataset, a churn size and a churn rate of the users of each user segment. For example, application server 120 may count a number of total users in each user segment based on the respective segment identifier. Application server 120 may determine a churn size of each user segment by counting a number of users who cancel the subscription to the online product during a period of time based on the retention label in each user feature dataset. Application server 120 may determine a churn rate of each user segment by calculating a ratio of the number of users who cancel the subscription to a total number of users in each user segment. For example, application server 120 may determine a 90-day churn rate for each user segment where users start a subscription to the online service product. Application server 120 may determine a Day 1 churn rate for each user segment where users cancel a subscription to the online service product first day right after they sign up.

At 704, application server 120 may update the first user datasets associated with a plurality of users with the respective segment identifier, churn size, and churn rate to form second user datasets.

At 706, based on the respective churn rate and churn size of each second user dataset, application server 120 may predict future retention levels and user features for each user segment during a near future time period. For example, different future retention levels may be assigned to the users based on certain thresholds associated with churn rates and churn sizes of user segments. Further, according to the predicted retention level for the user, application server 120 may determine one or more recommended actions for each user so as to prevent churns or lower churn rates and increase product engagement. For example, the system may offer guided welcome and task level tours for users identified with a segment of "care callers". The system may provide personalized value proposition for users identified with a segment of "toe dippers" based on a tree of interviews to understand intent. The system may offer no "Simple Start" option for "Migrator". The system may promote accounting 101 webinars for both "Care Callers" and "Toe Dippers". The system may offer personalized recommendations to increase product engagement.

FIG. 8A illustrates a three-dimensional (3D) graph representing example clusters generated according to the method described in the process 600 and 700. The 3D graph shows how each cluster of users or each user segment differentiates from other groups. The 3D graph may be generated based on condensed information extracted from the nodes of the second to last layer from the DNN 420. The condensed information may be represented in a human readable format and may be 16/32/64/128 in dimension. As illustrated in FIG. 8A, each dot on the graph may represent an actual user.

FIG. 8B illustrates example clusters in accordance with some embodiments. For example, the users associated with the original user feature datasets 128 may be classified into six user clusters. Each cluster may represent a cohort or group of users who share the similar features and user behavior patterns. As illustrated in FIG. 8B, clusters may be named as "Care Callers," "Toe Dippers," "Dabbles," "Invoices," "Expensers," and "Ninjas". A cluster of "Care Caller" may be associated with a group of users who may most likely cancel the subscription of the service product and churn to other service providers in the near future. The cluster of "Care Caller" may require calling for help. A cluster of "Ninjas" may be associated with users who have fairly established activities and show a stable engagement with the present product or service.

Figures 8C, 9A:
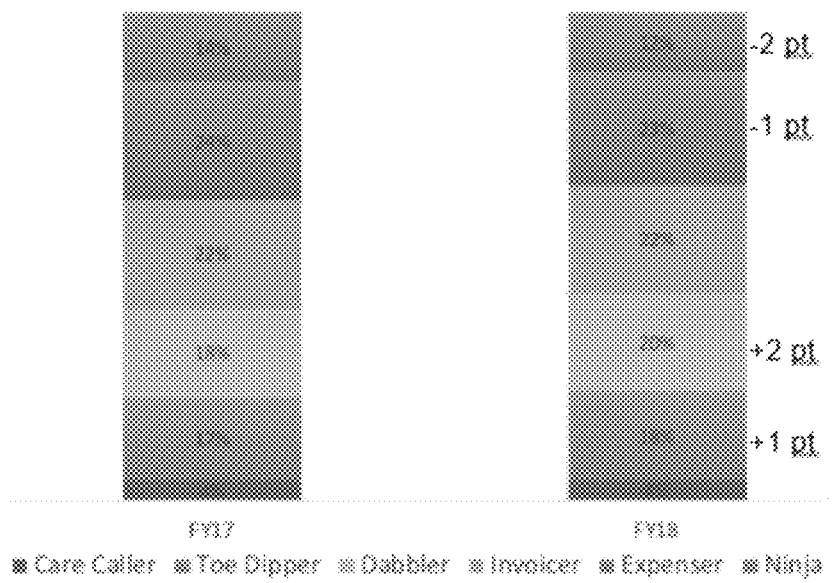
FIG. 8C illustrates example churn rates of respective clusters illustrated in FIG. 8B in accordance with some embodiments of the present disclosure.
FIG. 9A illustrates example cluster change trends in accordance with some embodiments of the present disclosure.

FIG. 8C illustrates example churn rates of respective clusters illustrated in FIG. 8B. FIG. 8C demonstrates for FY18 cohorts and each cluster may be represented with their corresponding churn rate within the first 90 Days and within first Day of signup. As illustrated, "Ninja," "Expensers" and "Invoicers" groups have relatively low churn rates and no Day 1 churn at all. "Toe Dippers" and "Care Callers" groups have substantially higher 90-day churn rates. "Toe Dippers" and "Care Callers" groups also include Day 1 cancellers who may be chosen by filtering users who are identified as New-To-The-Franchise (NTTF), purchase the SKU option as a Simple Start (SS) and choose not to attach accountant.

As described in the processes 600 and 700, the DNN 420 and the clustering model 125 may be trained to process and classify the user historical datasets based on the known user retention status. The DNN 420 illustrated in FIG. 4B may be trained with future retention as target (i.e. churn within the first 90 days since the service product signup date) to process features of user past activity (i.e. user QBO activity in first 30 days). For example, a combination of certain days' activities (e.g., day 2, 6, 8, 12 and 29 activity) may be fed into the DNN 420 for predicting 90-day churn rate to get an output from the second to last layer of the DNN 420. The output from the second to last layer may be used to train the clustering model 125 with an unsupervised algorithm to get the respective clusters or user segments based on the user features.

In some embodiments, the trained DNN 420 and the clustering model 125 may predict on new users (i.e. recent cohort, FY18). The new users' activity (i.e. day 3, 5, 7 and 10 activity), may be fed into the DNN 420 to obtain the values of the concatenated vector $x_{stack}$ 428 extracted from a second to last layer output. The vector $x_{stack}$ 428 may be feed to the clustering model 125 configured with the unsupervised algorithm to determine which clusters the users belong to. The new users may be grouped as the predicted cluster and compare to another group of users (i.e. users from same period of time of the previous year instead of the current year. For example, FY17 represents old cohort and FY18 represents new user cohort. The difference may be identified between these two cohorts that reside in the same cluster. The identified difference may be shown if there is a population shift between clusters from the previous year to the current year and if there is a performance (churn) difference within each cluster year over year.

FIG. 9A illustrates cluster change trends which demonstrate an implementation of the described processes. FIG. 9A shows "Ninja" and "Expenser" cohorts in FY18 decreased as compared to FY17 while "Dabbler" and "Toe Dipper" cohorts increased. It may be an indication that the service product base shifted towards higher attrition clusters.

FIG. 9B shows churn rates of each cluster of year FY17 and FY18. FIG. 9B shows "Ninja," "Expensers" and "Invoicers" cohorts are relatively same in terms of performance. The users of "Toe Dippers" have much higher churn rate, which may indicate that "Toe Dippers" cohort has become more challenging to satisfy with the product service they choose. This may be caused by a price increase in the provider product line in early FY18. The last two column in FIG. 9B represents the Year-over-Year (YOY) churn ratio between FY17 and FY18. The column named as "Index" represents Year-over-Year churn ratio where churn is defined as those users cancel their service or subscription within 90 days after sign up. The column named as "*Index" represents YOY churn ratio where churn is defined as those user cancel on the first day right after sign up. Day 1 canceller in a user segment may be chosen by filtering users who are identified as New-To-The-Franchise (NTTF), purchase the SKU option as a Simple Start (SS) and choose not to attach accountant. Product managers may be interested to understand the churn rate of the Day 1 cancellers and its relationship to user distribution over segments defined using the described method. As illustrated in FIG. 9B, the churn rate results show that no user in user segments of "Ninja," "Expenser" or "Invoicers" is a Day-1 canceller. However, percentages of Day-1 cancellers in user segments of "Dabblers" and "Toe-Dipper" in the year of FY18 are increased by more than 2 times compared to the year of FY17. The result may further shows the Day 1 cancellers may be less-experienced users who subscribe the service product with minimal effort to try the products and then decide to leave. The analysis shows that the churn rate increase of the Day 1 cancellers in "Dabblers" and "Toe-Dipper" segments in the year of FY18 may be caused by a combined effect of TV advertisement campaign driven top of funnel widening such that more users are intended to try the product service without seriously considering to use it. Additionally, the result may be caused by the basic product related SKU price increases.

As illustrated in FIGS. 8C, 9A and 9B, the summarized churn rate for respective user segment may represent a high level comprehensive user behavior summary. The marketers, program managers or analysts of a business may rely on both domain-experience and churn changes of a particular user segment or cluster group to analyze what happened behind scene.

All these trends or differences in comparison information may be displayed on dashboard for a purpose of business analysis to further determine any recommendations or services to users of a particular segment, cluster, or cohort, as described in FIG. 12A below.

The described processes may be performed by application server 120 for cohort analysis month over month or year over year, for users with same SKU, same channel, same industry, etc. The described process and analysis may be applied on any type of user feature aggregation or any possible combination of user features for cohort analysis to predict user churn rates or future user behaviors.

FIG. 10 illustrates example user segment profiles with user features and churn information for each user segment in accordance with some embodiments. For example, as illustrated, the churn size and churn rate of the user segment of "Care caller" may be "4%" and "73%", respectively. The churn size and churn rate of the user segment of "Ninja" may be "12%" and "1%", respectively. Further, FIG. 10 illustrates respective percentages of users of each segment who share the same features and/or the same user behaviors during an associated time period.

Figure 11:
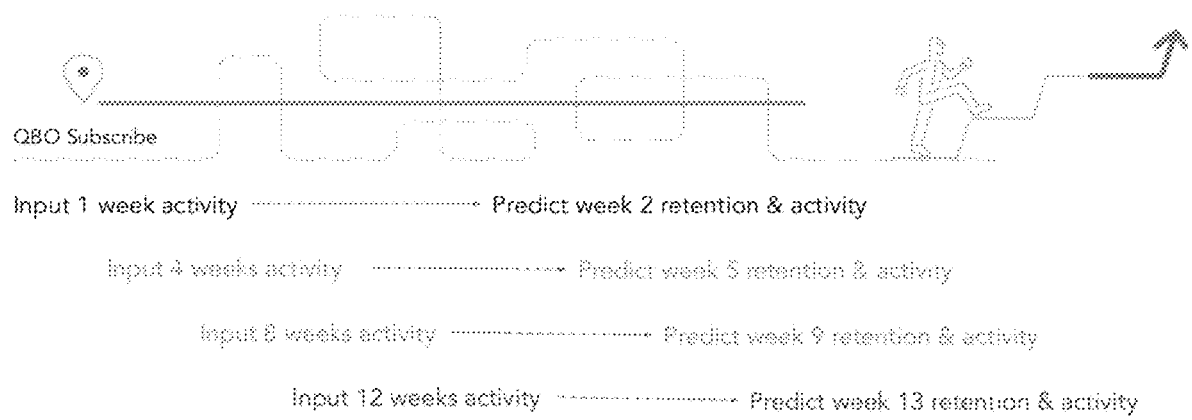
FIG. 11 illustrates an example prediction based on user weekly activity in accordance with some embodiments of the present disclosure.

FIG. 11 illustrates an example prediction based on user weekly activities in accordance with some embodiments. For example, the original user data features 128 may include users' behaviors (e.g., activities) during the past few weeks, such as 1 week, 4 weeks, 8 weeks or 12 weeks. For example, the process 700 illustrated in FIG. 7 may be implemented to generate updated user features with user segments based on the user data features 128 during the past 12 weeks. The process 700 may further be implemented to predict the 13th week's user retention level with the updated user features corresponding to associated user product usage based activities.

Figure 12A:
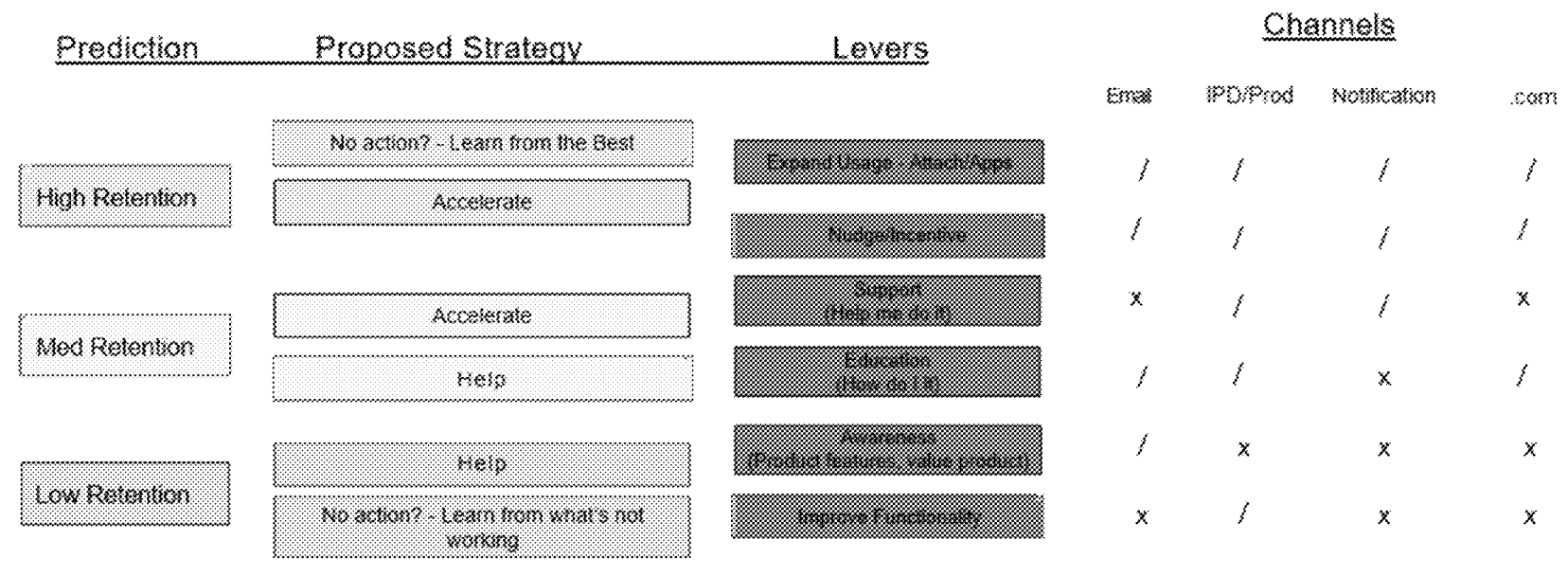

FIG. 12A illustrates example predicted retention levels to provide personalized recommendations to users in accordance with some embodiments. Applicant server 120 may determine one or more recommended actions for each user based on the predicted retention level. The recommended actions may be configured to be embedded in the online service product and implemented via at least of one of emails, messages, service phones, and help information of the online service application. The recommended actions may be provided to each user during a future time period through a plurality of communication channels via at least one network. Based on one or more recommended actions provided by application server 120 for each user, the service provider may launch an email campaign, launch an in-product advertise, launch a sales-agent phone call campaign, provide sales promotion, or take no action, etc. For example, for users in segments the of "Ninja" and "Expensers" with high retention level illustrated in FIG. 12A, application server 120 may take no action since the users use their products well. Application server 120 may provide extra services to accelerate and enhance their experience with QBO (i.e. promoting Apps or Attachment services). For users in the segments of "Invoicers" and "Dabblers" with a medium retention level illustrated in FIG. 12A, application server 120 may provide recommendations to accelerate the product service or provide help to the respective users via emails, in-product discovery (IPD), notification (e.g., text message, email, etc.) For users in the segments of "Toe Dippers and Care Callers" with a low retention level illustrated in FIG. 12A, application server 120 may improve the related application functionality and provide help to the respective users.

Figure 12B:
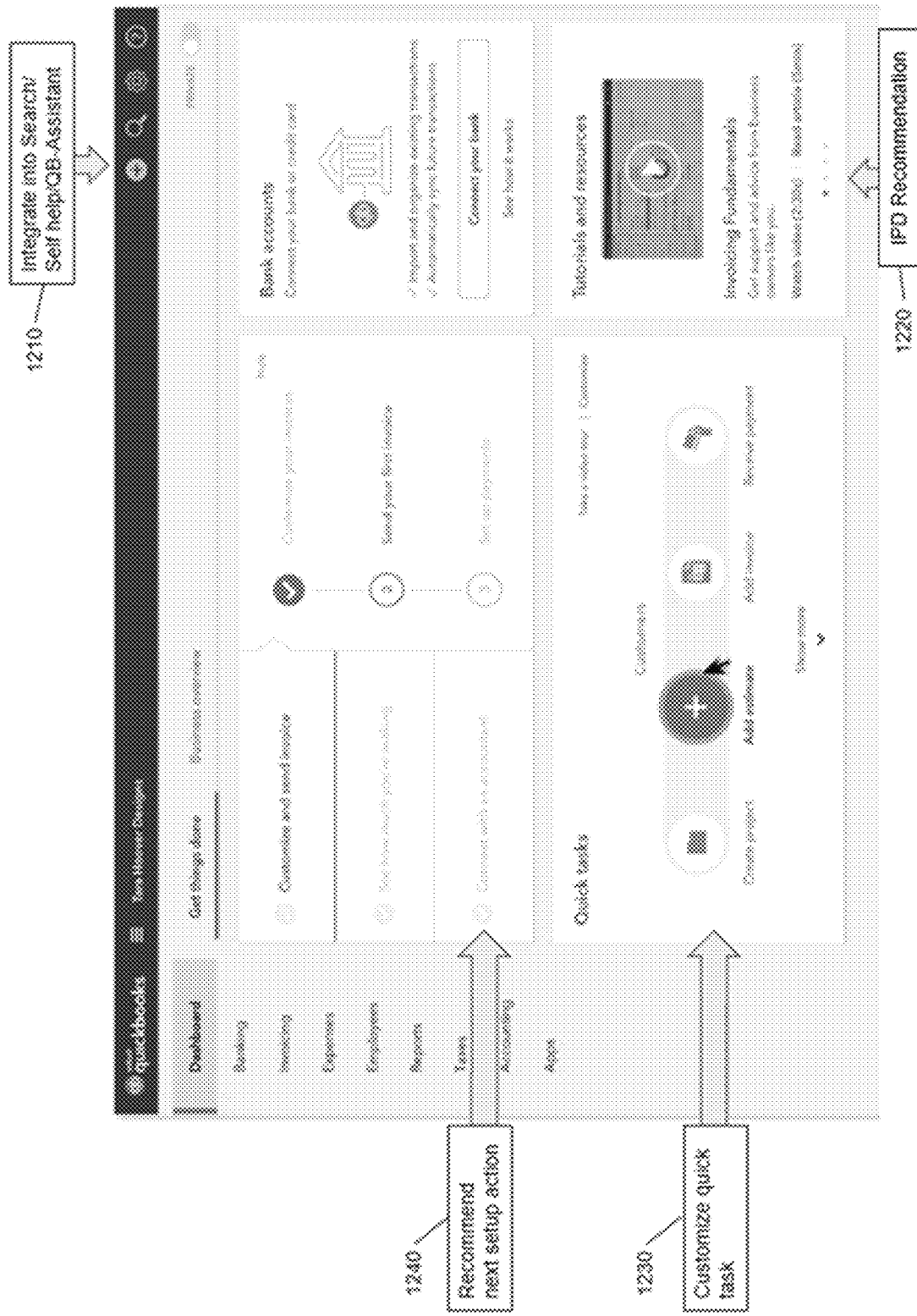
FIG. 12B illustrates an example system to integrate user segment related recommendations into an online product in a practical application in accordance with some embodiments of the present disclosure.

FIG. 12B illustrates an example system to integrate user segment related recommendations into an online product in a practical application in accordance with some embodiments of the present disclosure. As described, the present disclosure may utilize the deep learning processing result to predict churn rates for distinct user segments and to further provide personalized recommendation service for an individual user, which establishes a practical deep learning based application to lower churn rate and improve product engagement and activities of the users interacting within the online product. For example, personalized recommendations may be integrated with the online application (e.g., QuickBooks™ online application) and the content of the personalized recommendations may also be displayed on a user interface when the user is interacting with the online product. FIG. 12B illustrates some areas on a user interface where the described in-product notifications and recommendations may be displayed in the online application. For example, to better educate user, a self-help article may be embedded in the online application and shown in the upper right corner of the online application (1210). In-product advertisements and/or recommendations may be shown in in-product discovery (IPD) section (1220). The online application may provide customized quick tasks for users who are not familiarize with the online application (1230). Next setup actions may be recommended by the application server 120 and displayed on the user interface when the user access to the online application (1240).

Figure 13:
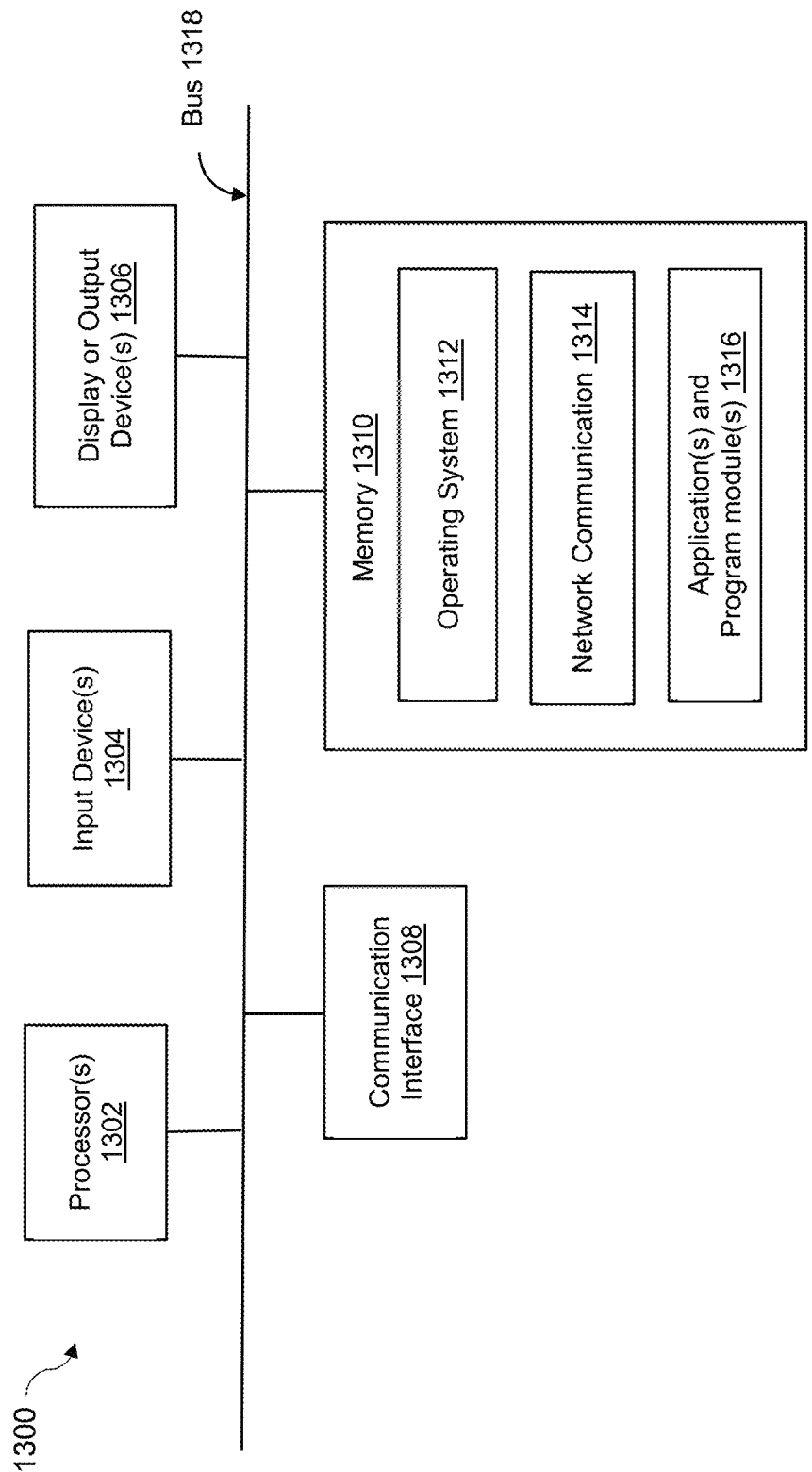
FIG. 13 is a block diagram of an example computing device in accordance with some embodiments of the present disclosure.

FIG. 13 is a block diagram of an example computing device 1300 that may be utilized to execute embodiments to implement processes including various features and functional operations as described herein. For example, computing device 1300 may function as application server 110, client device 130 or a portion or combination thereof in some embodiments. The computing device 1300 may be implemented on any electronic device to execute software applications derived from program instructions for a neural network system 124, and may include but is not limited to personal computers, servers, smart phones, media players, electronic tablets, game consoles, email devices, etc. In some implementations, the computing device 1300 may include one or more processors 1302, one or more input devices 1304, one or more display or output devices 1306, one or more communication interfaces 1308, and memory 1310. Each of these components may be coupled by bus 1318, or in the case of distributed computer systems, one or more of these components may be located remotely and accessed via a network.

Processor(s) 1302 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 1304 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 1306 such as a CRT (cathode ray tube) or LCD (liquid crystal display) monitor for displaying information to the user and a keyboard and a pointing device such as a mouse or a trackball by which the user can provide input to the computer. Display device 1306 may be any known display technology, including but not limited to display devices using Liquid Crystal Display (LCD) or Light Emitting Diode (LED) technology.

Communication interfaces 1308 may be configured to enable computing device 1300 to communicate with other another computing or network device across a network, such as via a wired connection, a wireless connection, or a combination of wired and wireless connections. For example, communication interfaces 1308 may include an Ethernet interface, an optical interface, a coaxial interface, an infrared interface, a radio frequency (RF) interface, a universal serial bus (USB) interface, a Wi-Fi interface, a cellular network interface, or the like.

Memory 1310 may be any computer-readable medium that participates in providing computer program instructions and data to processor(s) 1302 for execution, including without limitation, non-volatile storage media (e.g., optical disks, magnetic disks, flash drives, etc.), or volatile storage media (e.g., SDRAM, ROM, etc.). Memory 1310 may include various non-transitory computer-readable instructions for implementing an operating system 1312 (e.g., Mac OS®, Windows®, Linux), network communication 1314, and Application(s) and program modules 1316, etc. The operating system may be multi-user, multiprocessing, multitasking, multithreading, real-time, and the like. The operating system may perform basic tasks, including but not limited to: recognizing input from input device 1304; sending output to display device 1306; keeping track of files and directories on memory 1310; controlling peripheral devices (e.g., disk drives, printers, etc.) which can be controlled directly or through an I/O controller; and managing traffic on bus 1318. Bus 1318 may be any known internal or external bus technology, including but not limited to ISA, EISA, PCI, PCI Express, NuBus, USB, Serial ATA or FireWire.

Network communications instructions 1314 may establish and maintain network connections (e.g., software applications for implementing communication protocols, such as TCP/IP, HTTP, Ethernet, telephony, etc.).

Application(s) and program modules 1316 may include software application(s) and different functional program modules which are executed by processor(s) 1302 to implement the processes described herein and/or other processes. The program modules may include but not limited to software programs, objects, components, data structures that are configured to perform particular tasks or implement particular data types. The processes described herein may also be implemented in operating system 1312.

Communication between various network and computing devices may be facilitated by one or more application programming interfaces (APIs). APIs of system 1300 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a computing system, the computing system comprising one or more processors and one or more computer-readable storage devices storing computer-executable computer instructions, the method comprising executing the instructions thereby causing the computing system to perform operations comprising:
   receiving, by an application server, first user datasets associated with a plurality of users from a database, wherein the first user datasets comprise respective user identifiers, retention labels, static user features and interactive user features recorded as natural language characters by the application server as a result of a plurality of client devices accessing and interacting with an online service product provided by the application server via at least one network during a time period;
   processing, by the application server, through a first neural network, the natural language characters of the interactive user features to generate a time distributed concatenation representation of the interactive user features;
   generating, by the application server, through an embedding layer of a second neural network, a vector by embedding the time distributed concatenation representation and the static user features;
   processing by the application server, the vector through a plurality of layers of the second neural network;
   extracting by the application server, values from nodes of a second to last layer of the second neural network;
   determining, by the application server, based on the extracted values by a cluster model, a plurality of user segments with respective segment identifiers for the users, the segment identifiers associated with a prediction of future user interactions with the online service product; and
   customizing, by the application server, one or more of the interactive user features of the online service product for one or more of the users based on the prediction.

2. The method of claim 1, wherein the instructions are further operable to cause the computing system to perform:
   determining, based on the retention label of each user feature dataset, a churn size and a churn rate of users of each segment;
   updating the first user datasets with the respective segment identifier, churn size, and churn rate to form second user datasets; and
   predicting, based on the respective churn rate and churn size of the second user datasets, future retention levels and user features for each user segment during a future time period.

3. The method of claim 1, wherein processing the interactive user features through the first neural network comprises:
   applying a Bi-directional Long Short-Term Memory (Bi-LSTM) neural network to the interactive user features to generate a contextual representation of the interactive user features; and
   processing the contextual representation of the interactive user features through an attention layer to generate the time distributed concatenation representation of the interactive user features.

4. The method of claim 1, wherein the second neural network is trained till convergence based on the retention labels of the first user datasets, and wherein the second neural network comprising a first subnetwork and a second subnetwork, wherein the first subnetwork is configured to be trained by conducting a linear cross feature combination of the vector and wherein the second subnetwork is configured to be trained as a feed-forwarding network.

5. The method of claim 4, wherein the values extracted from the nodes of the second to last layer of the second neural network are generated by concatenating a first output of the first subnetwork and a second output from the second subnetwork at the second to last layer of the second neural network.

6. The method of claim 2, wherein the instructions are further operable to cause the computing system to perform:
   determining one or more recommended actions for each user, the recommended actions being configured to be embedded in the online service product and implemented via at least one of email, message, service phone, and help information of the online service product.

7. The method of claim 1, wherein the cluster model comprises a K-means clustering model.

8. The method of claim 1, wherein the interactive user features comprise a plurality of categories, each category comprising one or more time-stamped daily product usage based features.

9. A computing system, comprising:
   one or more processors; and
   one or more computer-readable storage devices storing computer-executable instructions, the instructions operable to cause the computing system to perform operations comprising:
   receiving, by an application server, first user datasets associated with a plurality of users from a database, wherein the first user datasets comprise respective user identifiers, retention labels, static user features and interactive user features recorded as natural language characters by the application server as a result of a plurality of client devices accessing and interacting with an online service product provided by the application server, via at least one network during a time period;
   processing, by the application server, through a first neural network, the natural language characters of the interactive user features to generate a time distributed concatenation representation of the interactive user features;
   generating, by the application server, through an embedding layer of a second neural network, a vector by embedding the time distributed concatenation representation and the static user features;
   processing, by the application server, the vector through a plurality of layers of the second neural network;

extracting, by the application server, values from nodes of a second to last layer of the second neural network;

determining, by the application server, based on the extracted values by a cluster model, a plurality of user segments with respective segment identifiers for the users, the segment identifiers associated with a prediction of future user interactions with the online service product; and customizing, by the application server, one or more of the interactive user features of the online service product for one or more of the users based on the prediction.

10. The computing system of claim 9, wherein the instructions are further operable to cause the computing system to perform:

determining, based on the retention label of each user feature dataset, a churn size and a churn rate of users of each segment;

updating the first user datasets with the respective segment identifier, churn size, and churn rate to form second user datasets; and predicting, based on the respective churn rate and churn size of the second user datasets, future retention levels and user features for each user segment during a future time period.

11. The computing system of claim 9, wherein processing the interactive user features through the first neural network comprises:

applying a Bi-directional Long Short-Term Memory (Bi-LSTM) neural network to the interactive user features to generate a contextual representation of the interactive user features; and processing the contextual representation of the interactive user features through an attention layer to generate the time distributed concatenation representation of the interactive user features.

12. The computing system of claim 9, wherein the second neural network is trained till convergence based on the retention labels of the first user datasets, and wherein the second neural network comprising a first subnetwork and a second subnetwork, wherein the first subnetwork is configured to be trained by conducting a linear cross feature combination of the vector and wherein the second subnetwork is configured to be trained as a feed-forwarding network.

13. The computing system of claim 12, wherein the values extracted from the nodes of the second to last layer of the second neural network are generated by concatenating a first output of the first subnetwork and a second output from the second subnetwork at the second to last layer of the second neural network.

14. The computing system of claim 10, wherein the instructions are further operable to cause the computing system to perform:

determining one or more recommended actions each user, the recommended actions being configured to be embedded in the online service product and implemented via at least one of email, message, service phone, and help information of the online service product.

15. The computing system of claim 9, wherein the cluster model comprises a K-means clustering model.

16. The computing system of claim 9, wherein the interactive user features comprise a plurality of categories, each category comprising one or more time-stamped daily product usage based features.

17. A method implemented by a computing system, the computing system comprising one or more processors and one or more computer-readable storage devices storing computer-executable computer instructions, the method comprising executing the instructions thereby causing the computing system to perform operations comprising:

receiving, by an application server, first user datasets associated with a plurality of users from a database, wherein the first user datasets comprise respective user identifiers, retention labels, static user features and interactive user features recorded as natural language characters by the application server as a result of a plurality of client devices accessing and interacting with an online service product provided by the application server via at least one network during a time period;

processing, by the application server, through a first neural network, the natural language characters of the interactive user features to generate a time distributed concatenation representation of the interactive user features;

generating, by the application server, through an embedding layer of a second neural network, a vector by embedding the time distributed concatenation representation and the static user features;

processing, by the application server, the vector through a plurality of layers of the second neural network;

extracting by the application server, values from nodes of a second to last layer of the second neural network;

determining, by the application server, based on the extracted values by a cluster model, a plurality of user segments with respective segment identifiers for the users, the segment identifiers associated with a prediction of future user interactions with the online service product;

determining, by the application server, based on the retention label of each user feature dataset, a churn size and a churn rate of users of each segment;

updating, by the application server, the first user datasets with the respective segment identifier, churn size, and churn rate to form second user datasets;

predicting, by the application server, based on the respective churn rate and churn size of the second user datasets, future retention levels and user features for each user segment during a future time period; and customizing, by the application server, one or more of the interactive user features of the online service product for one or more of the users based on the prediction.

18. The method of claim 17, wherein processing the interactive user features through the first neural network comprises:

applying a Bi-directional Long Short-Term Memory (Bi-LSTM) neural network to the interactive user features to generate a contextual representation of the interactive user features; and processing the contextual representation of the interactive user features through an attention layer to generate the time distributed concatenation of the interactive user features.

19. The method of claim 17, wherein the second neural network is trained till convergence based on the retention labels of the first user datasets, and wherein the second neural network comprising a first subnetwork and a second subnetwork, wherein the first subnetwork is configured to be trained by conducting a linear cross feature combination of the vector and wherein the second subnetwork is configured to be trained as a feed-forwarding network; and wherein the values extracted from the nodes of the second to last layer of the second neural network are generated by concatenating a first output of the first subnetwork and a second output from the second subnetwork at the second to last layer of the second neural network.

20. The method of claim 17, wherein the instructions are further operable to cause the computing system to perform:
    determining one or more recommended actions for each user, the recommended actions being configured to be embedded in the online service product and implemented via at least one of email, message, service phone, and help information of the online service product.

* * * * *